United States Patent
Iguchi (10) Patent No.: US 12,062,997 B2
(45) Date of Patent: Aug. 13, 2024

(54) CONTROL DEVICE AND MOTOR DRIVE SYSTEM

(71) Applicant: HONDA MOTOR CO., LTD., Tokyo (JP)

(72) Inventor: Tsuyoshi Iguchi, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 208 days.

(21) Appl. No.: 17/951,572

(22) Filed: Sep. 23, 2022

(65) Prior Publication Data

US 2023/0111419 A1    Apr. 13, 2023

(30) Foreign Application Priority Data

Sep. 27, 2021 (JP) ................. 2021-157208

(51) Int. Cl.
*H02M 7/5395* (2006.01)
*H02M 1/12* (2006.01)
(Continued)

(52) U.S. Cl.
CPC .......... *H02M 7/5395* (2013.01); *H02M 1/12* (2013.01); *H02P 27/085* (2013.01); *H02P 29/50* (2016.02)

(58) Field of Classification Search
CPC ........ H02P 27/085; H02P 29/50; H02P 21/05; H02P 5/00; H02M 1/12; H02M 7/5395; H02M 1/15
See application file for complete search history.

(56) References Cited

U.S. PATENT DOCUMENTS 4,823,251 A * 4/1989 Kawabata ............ H02H 7/1227
363/95
5,334,923 A * 8/1994 Lorenz .................... H02P 21/18
318/807

(Continued)

FOREIGN PATENT DOCUMENTS

JP    H09-130972 A    5/1997
JP    2005-304235 A    10/2005
(Continued)

OTHER PUBLICATIONS

Jun. 20, 2023, Translation of Japanese Office Action issued for related JP Application No. 2021-157208.

*Primary Examiner* — Yusef A Ahmed
(74) *Attorney, Agent, or Firm* — Paratus Law Group, PLLC (57) ABSTRACT

A control device includes: a prediction unit configured to predict the harmonic current at each of prediction points comprised in a predetermined prediction target period after current time, based on control information of the motor in at least a next carrier cycle of the inverter, and a command value determination unit configured to output, to the active filter unit, a current command value for generating a compensation current having a polarity opposite to a polarity of a harmonic current at a prediction point, at a timing corresponding to the prediction point comprised in the next carrier cycle in the prediction target period, based on a prediction result of the prediction unit. Each of the prediction points is provided at a predetermined time interval since start time of the prediction target period. The time interval is longer as the next carrier cycle is longer.

6 Claims, 5 Drawing Sheets

(51) Int. Cl.
*H02P 27/08* (2006.01)
*H02P 29/50* (2016.01)

(56) References Cited

U.S. PATENT DOCUMENTS

| | | | | |
|---|---|---|---|---|
| 5,459,524 A * | 10/1995 | Cooper | | H04N 9/45 |
| | | | | 348/508 |
| 5,910,892 A * | 6/1999 | Lyons | | H02M 7/487 |
| | | | | 363/132 |
| 10,003,285 B2 * | 6/2018 | Pramod | | H02P 6/28 |
| 10,250,179 B2 * | 4/2019 | Suzuki | | H02P 29/50 |
| 10,890,905 B1 * | 1/2021 | Sepe, Jr. | | B64D 31/00 |
| 11,876,471 B2 * | 1/2024 | Kulkarni | | H02M 1/126 |
| 2005/0073280 A1 * | 4/2005 | Yoshinaga | | H02P 21/00 |
| | | | | 318/727 |
| 2009/0067205 A1 * | 3/2009 | Oyobe | | B60L 50/16 |
| | | | | 903/904 |
| 2009/0267555 A1 * | 10/2009 | Schulz | | H02P 29/50 |
| | | | | 318/432 |
| 2010/0033996 A1 | 2/2010 | Kono | | |
| 2010/0123418 A1 * | 5/2010 | Itoh | | H02P 21/0089 |
| | | | | 318/400.15 |
| 2011/0181231 A1 * | 7/2011 | Ito | | B60L 50/51 |
| | | | | 318/801 |
| 2011/0279071 A1 * | 11/2011 | Yamada | | H02P 21/0089 |
| | | | | 318/400.02 |
| 2012/0207226 A1 * | 8/2012 | Gohshi | | G10L 19/0212 |
| | | | | 375/E7.123 |
| 2014/0210388 A1 * | 7/2014 | Ito | | H02P 6/10 |
| | | | | 318/400.2 |
| 2014/0225547 A1 * | 8/2014 | Yokozutsumi | | H02P 27/085 |
| | | | | 318/722 |
| 2016/0068066 A1 * | 3/2016 | Kinomura | | B60L 3/0061 |
| | | | | 290/7 |
| 2016/0226425 A1 * | 8/2016 | Kawashima | | H02M 5/45 |
| 2016/0311645 A1 * | 10/2016 | Agirman | | H02M 7/487 |
| 2017/0207739 A1 * | 7/2017 | Ang | | H02P 6/17 |
| 2017/0338764 A1 * | 11/2017 | Irie | | H02M 1/12 |
| 2018/0076744 A1 * | 3/2018 | Wolf | | H02P 6/10 |
| 2018/0152128 A1 * | 5/2018 | Araki | | H02P 27/06 |
| 2018/0254730 A1 * | 9/2018 | Yamamoto | | H02P 21/13 |
| 2019/0222160 A1 * | 7/2019 | Yoshida | | B60L 50/51 |
| 2019/0252972 A1 * | 8/2019 | Minaki | | H02P 6/10 |
| 2019/0363646 A1 * | 11/2019 | Ajima | | H02P 27/08 |
| 2020/0130730 A1 * | 4/2020 | Takase | | H02P 21/0003 |
| 2021/0111655 A1 * | 4/2021 | Takayama | | A45D 20/12 |
| 2021/0257947 A1 * | 8/2021 | Kinjo | | H02M 7/493 |
| 2021/0391817 A1 * | 12/2021 | Sano | | H02M 1/0009 |
| 2021/0408953 A1 * | 12/2021 | Ueki | | H02P 6/10 |
| 2022/0069760 A1 * | 3/2022 | Isoda | | G01K 7/42 |
| 2022/0190710 A1 * | 6/2022 | Kondou | | H02P 11/04 |
| 2023/0035063 A1 * | 2/2023 | Hara | | H02M 7/5387 |
| 2023/0223824 A1 * | 7/2023 | Hara | | H02P 21/22 |
| | | | | 310/68 R |
| 2023/0261561 A1 * | 8/2023 | Li | | H02M 1/12 |
| | | | | 318/400.26 |
| 2023/0402942 A1 * | 12/2023 | Hiwatari | | H02M 1/0058 |

FOREIGN PATENT DOCUMENTS

| | | |
|---|---|---|
| JP | 2021-040423 A | 3/2021 |
| WO | WO 2008/047479 A1 | 4/2008 |

* cited by examiner

CONTROL DEVICE AND MOTOR DRIVE SYSTEM

CROSS-REFERENCE TO RELATED APPLICATIONS

This application is based on and claims priority under 35 USC 119 from Japanese Patent Application No. 2021-157208 filed on Sep. 27, 2021, the contents of which are incorporated herein by reference.

TECHNICAL FIELD

The present invention relates to a control device that controls an active filter unit that suppresses a harmonic current generated from an inverter that drives a motor, and a motor drive system including the control device.

BACKGROUND

In recent years, as a specific measure against global climate change, efforts for implementing a low-carbon society or a decarbonized society have become active. Also in vehicles, a reduction in a CO2 emission amount has been strongly required, and electrification of a drive source has been progressing rapidly. Specifically, a vehicle (hereinafter, also referred to as an "electric vehicle") including a motor serving as a drive source and a battery serving as a power supply that supplies power to the motor, such as an electric automobile or a hybrid electric automobile, has been developed.

Generally, an alternating-current motor is used as the motor serving as the drive source of the electric vehicle. Therefore, the electric vehicle is provided with an inverter that converts direct-current power supplied from a battery, which is a direct-current power supply, into alternating-current power and supplies the alternating-current power to the motor. In a case of such a configuration, during a switching operation of the inverter, a harmonic current due to a surge noise current (hereinafter, also simply referred to as "harmonic current") may be generated on a power line that connects the battery and the inverter. Since such a harmonic current causes various failures such as abnormal sound, it is desirable to suppress (reduce) the harmonic current as much as possible.

JP-A-2005-304235 discloses a technique in which a passing current of a power line that connects a direct-current power supply and a power converter is measured by a current sensor, and a control device sequentially calculates a compensation current corresponding to an alternating current having a polarity opposite to that of an alternating-current component of the passing current measured by the current sensor, generates a current command value for generating the compensation current, and gives the current command value to an active filter. Then, the active filter supplies the compensation current in accordance with the current command value from the control device to the power line.

However, in the related art, there is room for improvement from a viewpoint of appropriately suppressing the harmonic current while reducing a processing load of the control device. For example, when the compensation current from the active filter is controlled by feedback control as in the above-described related art, responsiveness of the compensation current to the harmonic current becomes a problem.

In contrast, when the compensation current from the active filter is controlled by feedforward control, improvement of the responsiveness of the compensation current to the harmonic current can be expected, but the processing load of the control device may increase.

The present invention provides a technique that can appropriately suppress a harmonic current while reducing a processing load of a control device.

SUMMARY

An aspect of the present disclosure relates to a control device, in which
the control device is configured to control an active filter unit,
the active filter unit is configured to suppress a harmonic current generated from an inverter,
the inverter is configured to drive a motor, and
the control device includes:
  a prediction unit configured to predict the harmonic current at each of prediction points comprised in a predetermined prediction target period after current time, based on control information of the motor in at least a next carrier cycle of the inverter, and
  a command value determination unit configured to output, to the active filter unit, a current command value for generating a compensation current having a polarity opposite to a polarity of a harmonic current at a prediction point, at a timing corresponding to the prediction point comprised in the next carrier cycle in the prediction target period, based on a prediction result of the prediction unit,
each of the prediction points is provided at a predetermined time interval since start time of the prediction target period, and
the time interval is longer as the next carrier cycle is longer.

According to the present invention, it is possible to appropriately suppress a harmonic current while reducing a processing load of a control device.

BRIEF DESCRIPTION OF DRAWINGS

Exemplary embodiments of the present invention will be described in detail based on the following figures, wherein.

DESCRIPTION OF EMBODIMENTS

Hereinafter, an embodiment of a control device of the present invention will be described in detail with reference to the drawings. The embodiment described below is an example in which the control device of the present invention is applied to a motor drive system of an electric vehicle.

[Motor Drive System]

Figure 1:
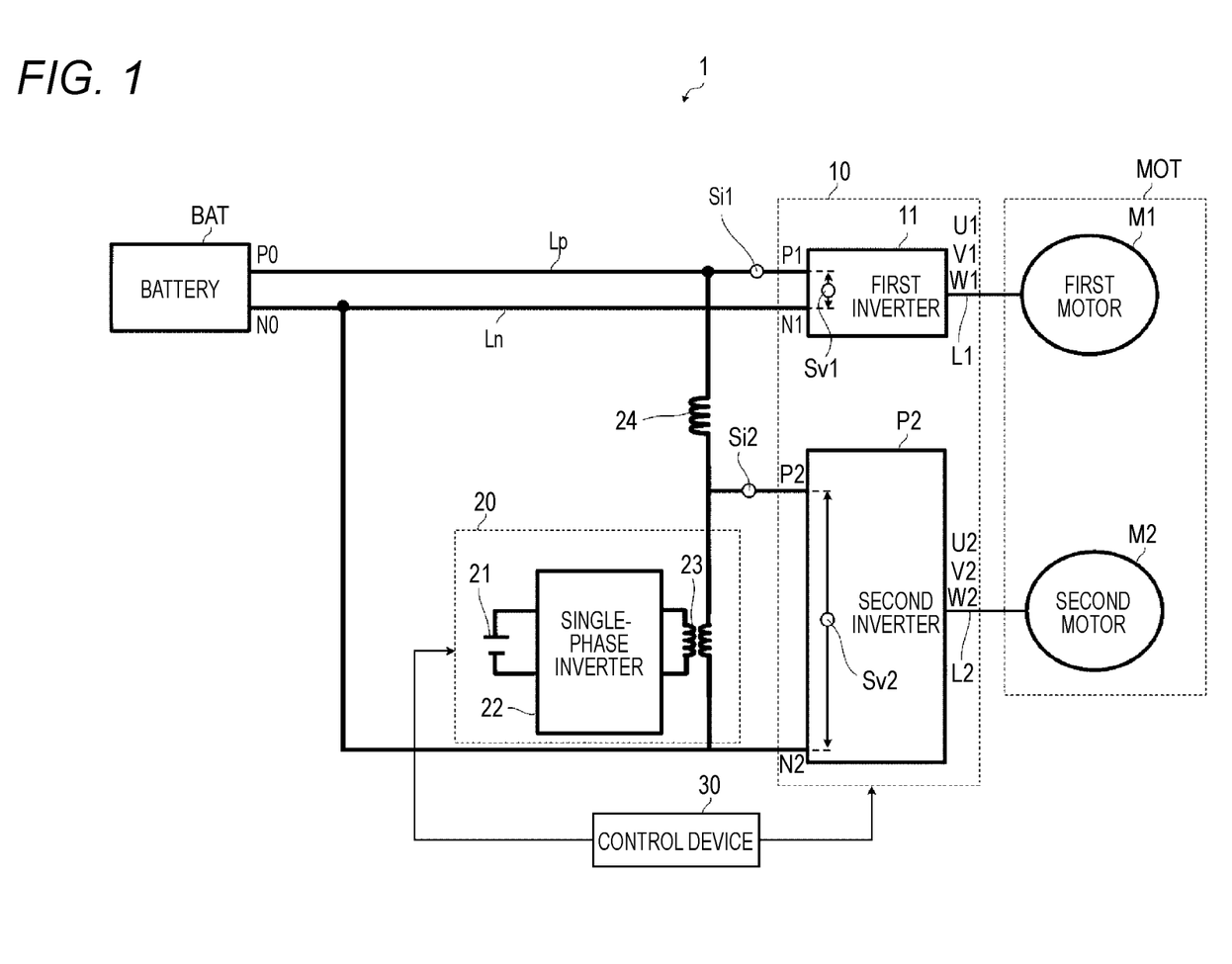
FIG. 1 is a diagram showing an example of a motor drive system 1.

The electric vehicle (hereinafter, also referred to as a "vehicle V") of the present embodiment includes a motor drive system 1 shown in FIG. 1. The motor drive system 1 includes a battery BAT that is a direct-current power supply, a drive motor MOT serving as a drive source that drives drive wheels (not shown) of the vehicle V, a power conversion unit 10 that converts power exchanged between the battery BAT and the drive motor MOT, an active filter unit 20, and a control device 30.

The battery BAT is a power storage device that can store power for driving the vehicle V (that is, power for driving the drive motor MOT). A positive electrode terminal (indicated by "P0" in FIG. 1) of the battery BAT is connected to a high potential side power line Lp, and a negative electrode terminal (indicated by "N0" in FIG. 1) of the battery BAT is connected to a low potential side power line Ln. The battery BAT is configured to be able to output a high voltage of 100 to 400 [V] as an inter-terminal voltage between the positive electrode terminal and the negative electrode terminal by connecting a plurality of unit power storage cells (not shown) implemented by, for example, a lithium-ion battery or the like in series or in series-parallel.

The drive motor MOT includes a first motor M1 and a second motor M2 having a higher output than the first motor M1. Each of the first motor M1 and the second motor M2 is, for example, a permanent magnet synchronous three-phase AC motor. The first motor M1 and the second motor M2 may drive a common drive wheel or may drive different drive wheels.

Each of the first motor M1 and the second motor M2 is provided with a motor sensor (not shown) that detects a state of the first motor M1 or the second motor M2. An example of the motor sensor is a resolver that detects a rotation angle of a rotor. The motor sensor transmits a detection signal indicating a detection result (for example, a rotation angle of the rotor) to the control device 30. At this time, the motor sensor may transmit the detection signal to the control device 30 via an in-vehicle network such as a controller area network (CAN).

The power conversion unit 10 includes a first inverter 11 and a second inverter 12 having a higher output than the first inverter 11. Each of the first inverter 11 and the second inverter 12 is, for example, a three-phase inverter including six switching elements (not shown) driven in accordance with a control signal from the control device 30. The switching element is an insulated gate bipolar transistor (IGBT), a metal-oxide-semiconductor field effect transistor (MOSFET), or the like.

A high potential side direct-current terminal (indicated by "P1" in FIG. 1) of the first inverter 11 is connected to the positive electrode terminal of the battery BAT via the high potential side power line Lp. Further, a low potential side direct-current terminal (indicated by "N1" in FIG. 1) of the first inverter 11 is connected to the negative electrode terminal of the battery BAT via the low potential side power line Ln. An alternating-current terminal (indicated by "U1, V1, W1" in FIG. 1) of the first inverter 11 is connected to the first motor M1 via a first three-phase line L1.

The first inverter 11 converts power (direct-current power) of the battery BAT input via the high potential side direct-current terminal and the low potential side direct-current terminal into three-phase alternating-current power. The first inverter 11 outputs the converted alternating-current power to the first motor M1 via the alternating-current terminal. That is, the high potential side direct-current terminal and the low potential side direct-current terminal of the first inverter 11 can also be referred to as an input unit of the first inverter 11, and the alternating-current terminal of the first inverter 11 can also be referred to as an output unit of the first inverter 11.

The first inverter 11 is provided with a voltage sensor Sv1 that detects an inter-terminal voltage between the high potential side direct-current terminal and the low potential side direct-current terminal (that is, an input voltage to the first inverter 11). The voltage sensor Sv1 transmits a detection signal indicating a detection result to the control device 30 via the in-vehicle network or the like. Further, the high potential side power line Lp that connects the battery BAT and the first inverter 11 is provided with a current sensor Si1 that detects a value of a current that flows through the power line. The current sensor Si1 transmits a detection signal indicating a detection result to the control device 30 via the in-vehicle network or the like. Further, a current sensor that detects a value of a current that flows through each phase may also be provided in the first three-phase line L1 that connects the first inverter 11 and the first motor M1, and a detection signal from the current sensor may be transmitted to the control device 30.

Similar to the first inverter 11, a high potential side direct-current terminal (indicated by "P2" in FIG. 1) of the second inverter 12 is connected to the positive electrode terminal of the battery BAT via the high potential side power line Lp. Further, a low potential side direct-current terminal (indicated by "N2" in FIG. 1) of the second inverter 12 is connected to the negative electrode terminal of the battery BAT via the low potential side power line Ln. An alternating-current terminal (indicated by "U2, V2, W2" in FIG. 1) of the second inverter 12 is connected to the second motor M2 via a second three-phase line L2.

The second inverter 12 converts power (direct-current power) of the battery BAT input via the high potential side direct-current terminal and the low potential side direct-current terminal into three-phase alternating-current power. Then, the second inverter 12 outputs the converted alternating-current power to the second motor M2 via the alternating-current terminal. That is, the high potential side direct-current terminal and the low potential side direct-current terminal of the second inverter 12 can also be referred to as an input unit of the second inverter 12, and the alternating-current terminal of the second inverter 12 can also be referred to as an output unit of the second inverter 12.

The second inverter 12 is provided with a voltage sensor Sv2 that detects an inter-terminal voltage between the high potential side direct-current terminal and the low potential side direct-current terminal (that is, an input voltage to the second inverter 12). The voltage sensor Sv2 transmits a detection signal indicating a detection result to the control device 30 via the in-vehicle network or the like. Further, the high potential side power line Lp that connects the battery BAT and the second inverter 12 is provided with a current sensor Si2 that detects a value of a current that flows through the power line. The current sensor Si2 transmits a detection signal indicating a detection result to the control device 30 via the in-vehicle network or the like. Further, a current sensor that detects a value of a current that flows through each phase may also be provided in the second three-phase line L2 that connects the second inverter 12 and the second motor M2, and a detection signal from the current sensor may be transmitted to the control device 30.

In the motor drive system 1, during switching operations of the first inverter 11 and the second inverter 12, a harmonic current due to a surge noise current may be generated on the high potential side power line Lp. Since a harmonic current generated from the first inverter 11 having a low output is relatively small, an influence of the harmonic current on the battery BAT and the second inverter 12 is also relatively small. In contrast, a relatively large harmonic current may be generated from the second inverter 12 having a high output. Such a large harmonic current may cause a failure of the battery BAT, the first inverter 11, or the like.

Therefore, in the motor drive system 1, the active filter unit 20 that can suppress the harmonic current generated from the second inverter 12 is provided. The active filter unit 20 includes a low-voltage power supply 21 that is a direct-current power supply for causing the active filter unit 20 to generate a compensation current having a polarity (opposite phase) opposite to that of the harmonic current generated from the second inverter 12, and a single-phase inverter 22 that generates alternating-current power corresponding to a compensation current from power (direct-current power) supplied from the low-voltage power supply 21. The single-phase inverter 22 includes, for example, four switching elements (not shown) driven in accordance with a control signal from the control device 30, and generates a compensation current by switching these switching elements. The compensation current generated by the active filter unit 20 (single-phase inverter 22) is supplied to the high potential side power line Lp via an isolation transformer 23.

In the present embodiment, an inductor 24 is also provided between the battery BAT and the first inverter 11 as well as the second inverter 12, in addition to the active filter unit 20. Accordingly, the harmonic current generated from the second inverter 12 can also be suppressed by the inductor 24. That is, according to the configuration of the present embodiment, the harmonic current generated from the second inverter 12 can be more effectively suppressed by combination of the compensation current by the active filter unit 20 and the inductor 24. The inductor 24 is not an essential component, and may also be omitted.

The control device 30 comprehensively controls the entire vehicle V including the motor drive system 1. For example, the control device 30 controls driving of the first inverter 11 and the second inverter 12 (that is, on/off of the switching elements) by triangular wave comparison type pulse width modulation (PWM) control to control power supplied from the first inverter 11 to the first motor M1 or power supplied from the second inverter 12 to the second motor M2. The control device 30 can control driving of the first motor M1 by controlling the power supplied from the first inverter 11 to the first motor M1, and can control driving of the second motor M2 by controlling the power supplied from the second inverter 12 to the second motor M2.

For example, the control device 30 derives a driving force required for traveling of the vehicle V (hereinafter, also referred to as a "required driving force") based on a traveling speed of the vehicle V detected by a vehicle speed sensor (not shown) and an AP opening degree of the vehicle V detected by an AP (accelerator position) sensor (not shown). Then, the control device 30 controls output of the first motor M1 and/or the second motor M2 by using the derived required driving force as a target value.

The control device 30 controls driving of the single-phase inverter 22 (that is, on/off of the switching elements) by, for example, the triangular wave comparison type PWM control to control the compensation current supplied from the active filter unit 20 to the high potential side power line Lp. Based on control information of the drive motor MOT and the like, the control device 30 predicts the harmonic current generated by switching operations of the inverters of the power conversion unit 10 and controls the compensation current from the active filter unit 20 by feedforward control. Accordingly, responsiveness of the compensation current to the harmonic current can be improved as compared with a case where the compensation current from the active filter unit 20 is controlled by feedback control.

More specifically, in the present embodiment, the control device 30 controls the active filter unit 20 so as to generate the compensation current for suppressing the harmonic current generated from the second inverter 12 based on control information of the second motor M2. Here, the control information of the second motor M2 is information that makes it possible to predict the harmonic current generated from the second inverter 12, and is, for example, information representing a carrier signal (for example, a carrier cycle) of the second inverter 12, a dq-axis voltage, a dq-axis current, a motor electric angle, a rotation speed, a Vpn voltage, and the like of the second motor M2. The control information of the second motor M2 can be acquired based on detection results of a motor sensor (for example, a resolver) provided in the second motor M2, the voltage sensor Sv2, the current sensor Si2, and the like.

The control device 30 can be implemented by, for example, an electronic control unit (ECU) including a processor that performs various calculations, a storage device that stores various pieces of information, an input and output device that controls input and output of data between an inside and an outside of the control device 30, and the like. Further, the control device 30 may be implemented by one ECU or may be implemented by a plurality of ECUs.

[Active Filter Control Unit]

Figure 2:
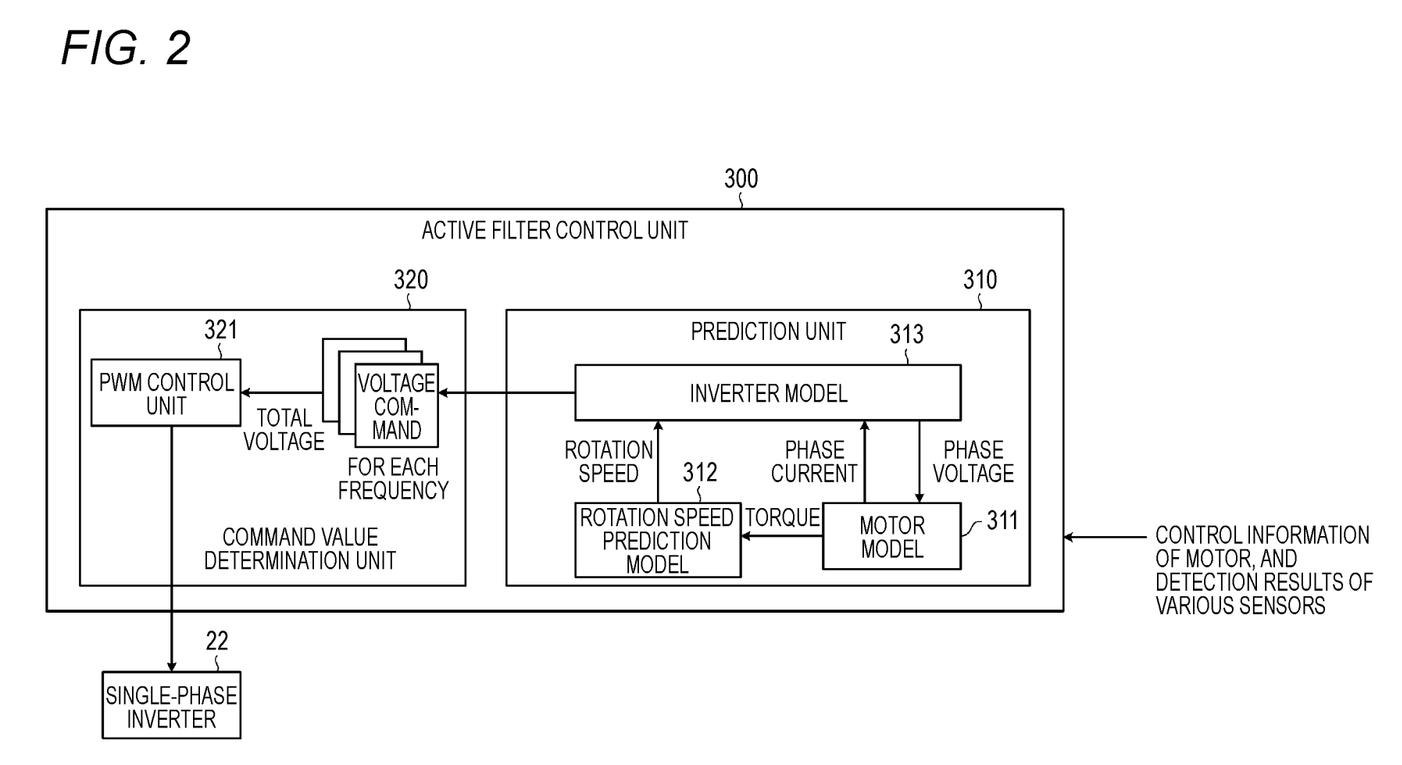
FIG. 2 is a block diagram showing an example of an active filter control unit 300 of a control device 30.

Next, an example of an active filter control unit 300, which is a functional unit of the control device 30 for controlling the active filter unit 20, will be described. As shown in FIG. 2, the active filter control unit 300 includes a prediction unit 310 and a command value determination unit 320.

For example, the prediction unit 310 predicts the harmonic current from the second inverter 12 at each of prediction points included in a predetermined prediction target period after current time based on the control information of the second motor M2 in at least a next carrier cycle of the second inverter 12.

Specifically, the prediction unit 310 includes a motor model 311 obtained by modeling the second motor M2, a rotation speed prediction model 312 for predicting the rotation speed of the second motor M2, and an inverter model 313 obtained by modeling the second inverter 12.

By using the motor model 311, the prediction unit 310 predicts an output torque of the second motor M2 and a phase current that flows through each phase at a predetermined timing (for example, each of the prediction points included in the prediction target period) after current time based on the control information of the second motor M2, detection results of the voltage sensor Sv2 and the current sensor Si2, a phase voltage derived by the inverter model 313, and the like.

By using the rotation speed prediction model 312, the prediction unit 310 predicts the rotation speed of the second motor M2 at the predetermined timing (for example, each of the prediction points included in the prediction target period) after the current time based on the output torque of the second motor M2 predicted by the motor model 311. The control device 30 determines the carrier cycle of the second inverter 12 (for example, a next carrier cycle of the second inverter 12) after a current cycle based on the rotation speed of the second motor M2 predicted by the rotation speed prediction model 312.

By using the inverter model 313, the prediction unit 310 predicts the harmonic current generated from the second inverter 12 at the predetermined timing (for example, each of the prediction points included in the prediction target period) after the current time, based on the phase current of the second motor M2 predicted by the motor model 311, the rotation speed of the second motor M2 predicted by the rotation speed prediction model 312, the detection result of the current sensor Si2, and the like. Then, when predicting the harmonic current generated from the second inverter 12, the prediction unit 310 passes a prediction result thereof to the command value determination unit 320.

For example, based on the prediction result of the prediction unit 310, the command value determination unit 320 outputs, to the active filter unit 20, a current command value for generating a compensation current having a polarity opposite to that of the harmonic current at a prediction point at a timing corresponding to the prediction point included in the next carrier cycle.

Specifically, the command value determination unit 320 generates, from the harmonic current obtained as the prediction result of the prediction unit 310, a voltage command value for each frequency for causing the active filter unit 20 to generate a compensation current having a polarity opposite to that of the harmonic current. Then, based on the generated voltage command value for each frequency, the command value determination unit 320 causes a PWM control unit 321 to PWM control the single-phase inverter 22, and causes the single-phase inverter 22 to generate the compensation current.

The active filter control unit 300 including the prediction unit 310 and the command value determination unit 320 can be implemented, for example, by a processor of an ECU that implements the control device 30 executing a program stored in advance in a storage device.

[Specific Example of Prediction of Harmonic Current by Control Device]

Next, a specific example of prediction of the harmonic current by the control device 30 (active filter control unit 300) will be described with reference to FIG. 3.

Figure 3:
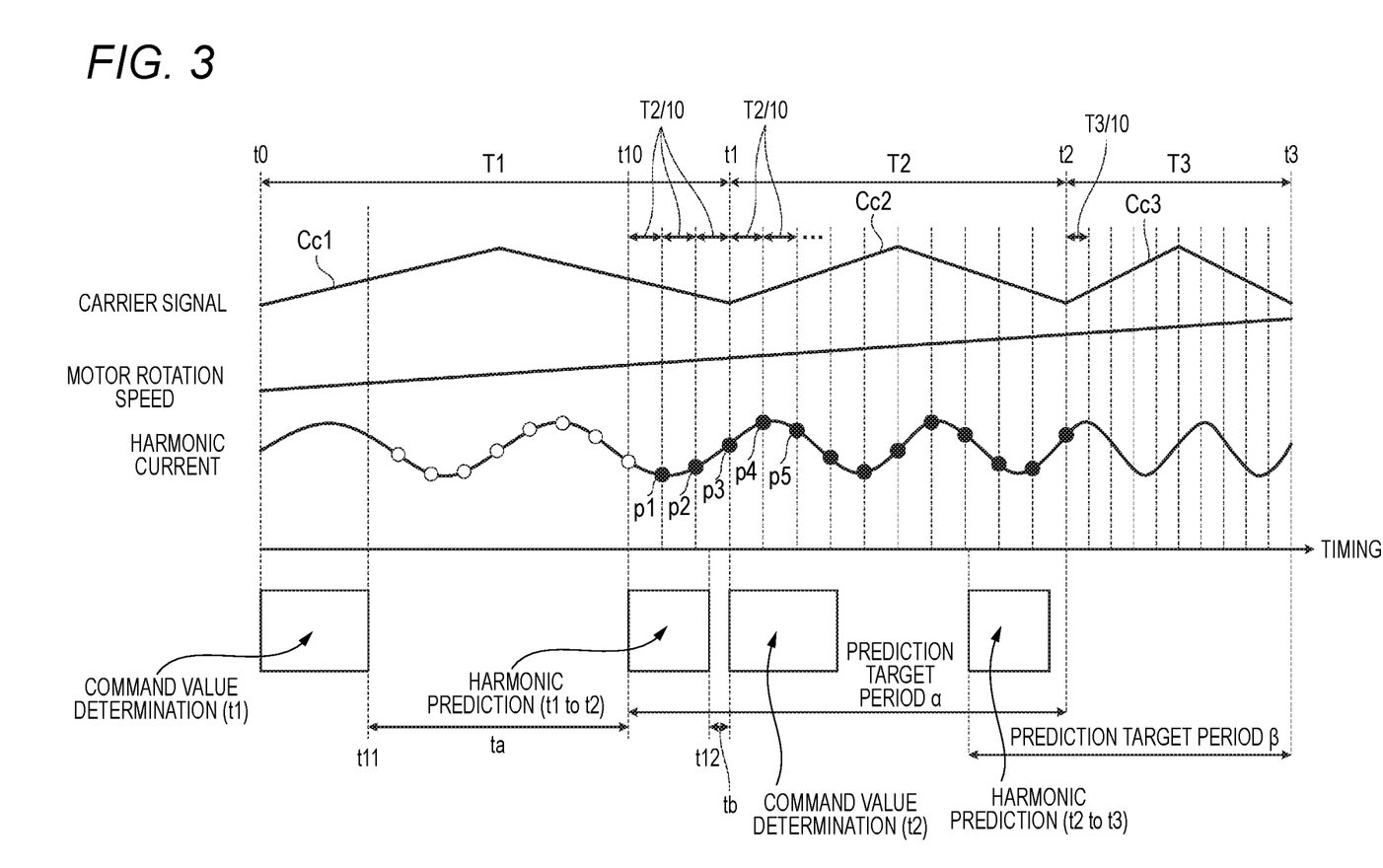
FIG. 3 is a diagram showing a specific example of prediction of a harmonic current by the control device 30 (active filter control unit 300)

In the example shown in FIG. 3, the carrier signal used by the control device 30 to drive the second inverter 12 (that is, the second motor M2) has three carrier cycles, that is, a first cycle Cc1 from a timing t0 to a timing t1, a second cycle Cc2 from a timing t1 to a timing t2, and a third cycle Cc3 from a timing t2 to a timing t3.

In the example shown in FIG. 3, the rotation speed of the second motor M2 (shown as "motor rotation speed" in FIG. 3) increases as the rotation speed becomes later in time series, and accordingly, the carrier cycle also becomes shorter as the rotation speed becomes later in time series. Specifically, when a length of the first cycle Cc1 is T1 [s], a length of the second cycle Cc2 is T2 [s], and a length of the third cycle Cc3 is T3 [s], T1>T2>T3.

In order to control the compensation current generated from the active filter unit 20 by feedforward control, the control device 30 predicts a harmonic current at each of prediction points included in a predetermined prediction target period from current time (that is, a prediction start timing) at a predetermined prediction start timing. Here, the prediction target period may be, for example, a period including at least a next carrier cycle of the inverter (here, the second inverter 12) that is a generation source of the harmonic current that is a suppression target.

In the present embodiment, a period from a prediction start timing, which is a timing before a predetermined period of a start timing of a next carrier cycle, to an end timing of the next carrier cycle may be set as the prediction target period. Further, as the prediction start timing, a timing is set such that prediction of the harmonic current for the prediction target period including the carrier cycle can be completed by the start timing of the next carrier cycle.

Specifically, with a start of the first cycle Cc1, the control device 30 first determines various command values used to control the second inverter 12 and the like in the next carrier cycle (that is, the second cycle Cc2) (shown as "command value determination (t1)" in FIG. 3). Accordingly, the length of the second cycle Cc2, switching content of the second inverter 12 in the second cycle Cc2, and the like are determined.

Then, after determining the various command values in the second cycle Cc2, the control device 30 starts prediction of the harmonic current generated in the second cycle Cc2 at a timing t10 that is the prediction start timing (shown as "harmonic prediction (t1 to t2)" in FIG. 3).

When predicting the harmonic current generated in the second cycle Cc2, the control device 30 sets a period from the timing t10 to the timing t2 as the prediction target period (shown as a "prediction target period α" in FIG. 3), and predicts the harmonic current at each of the prediction points included in the prediction target period. As shown in FIG. 3, the prediction target period α includes the second cycle Cc2.

Each prediction point is provided at a predetermined time interval from start time of the prediction target period (that is, the prediction start timing). The time interval (hereinafter, also referred to as an "interval between prediction points") is proportional to a length of the next carrier cycle, and becomes longer as the next carrier cycle becomes longer. As an example, in the present embodiment, when the length of the next carrier cycle is Tx [s] and the interval between the prediction points is Sx [s], Sx=Tx/10 is satisfied. That is, in the present embodiment, the number of prediction points included in the next carrier cycle is 10, which is constant, regardless of the length of the carrier cycle.

Specifically, in the prediction target period a shown in FIG. 3, prediction points indicated by black circles in FIG. 3 are provided. Among these prediction points, a prediction point p1 that is the earliest in time series is a timing after T2/10 [s] since the timing t10, and a prediction point p2 next to the prediction point p1 is a timing after T2/10 [s] from the prediction point p1. Further, a prediction point p3 next to the prediction point p2 is a timing after T2/10 [s] from the prediction point p2, a prediction point p4 next to the prediction point p3 is a timing after T2/10 [s] from the prediction point p3, and a prediction point p5 next to the prediction point p4 is a timing after T2/10 [s] from the prediction point p4. Similarly, the prediction points after the prediction point p5 are provided at intervals of T2/10 [s] until the timing t2, which is the end timing of the second cycle Cc2.

Similarly, with a start of the second cycle Cc2, the control device 30 determines various command values (shown as "command value determination (t2)" in FIG. 3) used to control the second inverter 12 in a next carrier cycle (that is, the third cycle Cc3). Then, after determining the various command values in the third cycle Cc3, the control device 30 predicts the harmonic current generated in the third cycle Cc3 (shown as "harmonic prediction (t2 to t3)" in FIG. 3). In this case, the interval between the prediction points in a prediction target period (shown as a "prediction target period i" in FIG. 3) is proportional to a length of the third cycle Cc3, and specifically is T3/10 [s] as shown in FIG. 3.

In this way, when the harmonic current generated in the next carrier cycle is predicted, the harmonic current at the prediction point provided at the time interval proportional to the length of the carrier cycle is predicted, so that it is possible to accurately predict the harmonic current generated in the carrier cycle and to reduce a processing load of the control device 30 for performing the prediction.

It is assumed that, when the harmonic current generated in the next carrier cycle is predicted, the harmonic current at the prediction point provided at a constant time interval is predicted regardless of the length of the carrier cycle. In this case, in order to accurately predict the harmonic current generated in the next carrier cycle, it is necessary to shorten the interval between the prediction points to some extent. However, when the carrier cycle is relatively long, since a change in the harmonic current generated in the carrier cycle is gentle, even when the harmonic current is not predicted at such short intervals, it is possible to accurately predict the harmonic current generated in the carrier cycle.

Therefore, in the present embodiment, by predicting the harmonic current at the prediction point provided at the time interval proportional to the length of the next carrier cycle, prediction of harmonic currents at excessive prediction points is reduced, and a processing load of the control device 30 in predicting the harmonic current generated in the next carrier cycle is reduced.

Since the prediction points are provided at time intervals proportional to the length of the next carrier cycle, the number of prediction points can be made substantially constant regardless of the length of the carrier cycle. Therefore, it is possible to predict the harmonic current generated in the carrier cycle with a substantially constant processing load regardless of the length of the next carrier cycle. Accordingly, regardless of how the carrier cycle changes, power consumption of the control device 30 for predicting the harmonic current generated in each carrier cycle can be made substantially constant. In this way, by making the power consumption of the control device 30 for predicting the harmonic current generated in each carrier cycle substantially constant, it is possible to facilitate estimation of the power consumption.

Incidentally, as described above, the prediction start timing, which is a start point of the prediction target period, is a timing after the start timing of the next carrier cycle. Therefore, for example, the prediction target period α also includes the prediction points outside the second cycle Cc2, such as the prediction point p1 and the prediction point p2. Prediction results of the harmonic current at the prediction points outside the next carrier cycle are not used to generate the compensation current that suppresses the harmonic current generated in the next carrier cycle. Therefore, it is desirable to reduce such useless prediction points as much as possible.

Therefore, in the present embodiment, a first period from the completion timing at which prediction of the harmonic current at each of the prediction points included in the prediction target period is completed to the start timing of the next carrier cycle is set to be shorter than a second period from the timing at which the command value for driving the inverter in the next carrier cycle is determined to the prediction start timing at which prediction of the harmonic current at each of the prediction points included in the prediction target period is started.

Specifically, as shown in FIG. 3, a timing at which various command values for driving the second inverter 12 are determined in the second cycle Cc2 is t11, and a completion timing at which prediction of the harmonic current at each of prediction points included in the prediction target period α including the second cycle Cc2 is completed is t12. In this case, a period tb from the timing t12 to the timing t1 corresponds to the first period, and a period ta from the timing t11 to the timing t10 corresponds to the second period. The period tb is set to be shorter than the period ta.

In this way, by setting the prediction start timing as late as possible within a range in which prediction of the harmonic current for the prediction target period including a carrier cycle can be completed by the start timing of the next carrier cycle, it is possible to reduce the above-described useless prediction points. And it is possible to further reduce the processing load of the control device 30 for predicting the harmonic current generated in the next carrier cycle.

In contrast, it is assumed that the prediction start timing at which prediction of the harmonic current generated in the second cycle Cc2 is started is set as the timing t11 at which the various command values for driving the second inverter 12 are determined in the second cycle Cc2, the number of useless prediction points as indicated by white circles in FIG. 3 increases, and therefore the processing load of the control device 30 increases accordingly.

Figure 4:
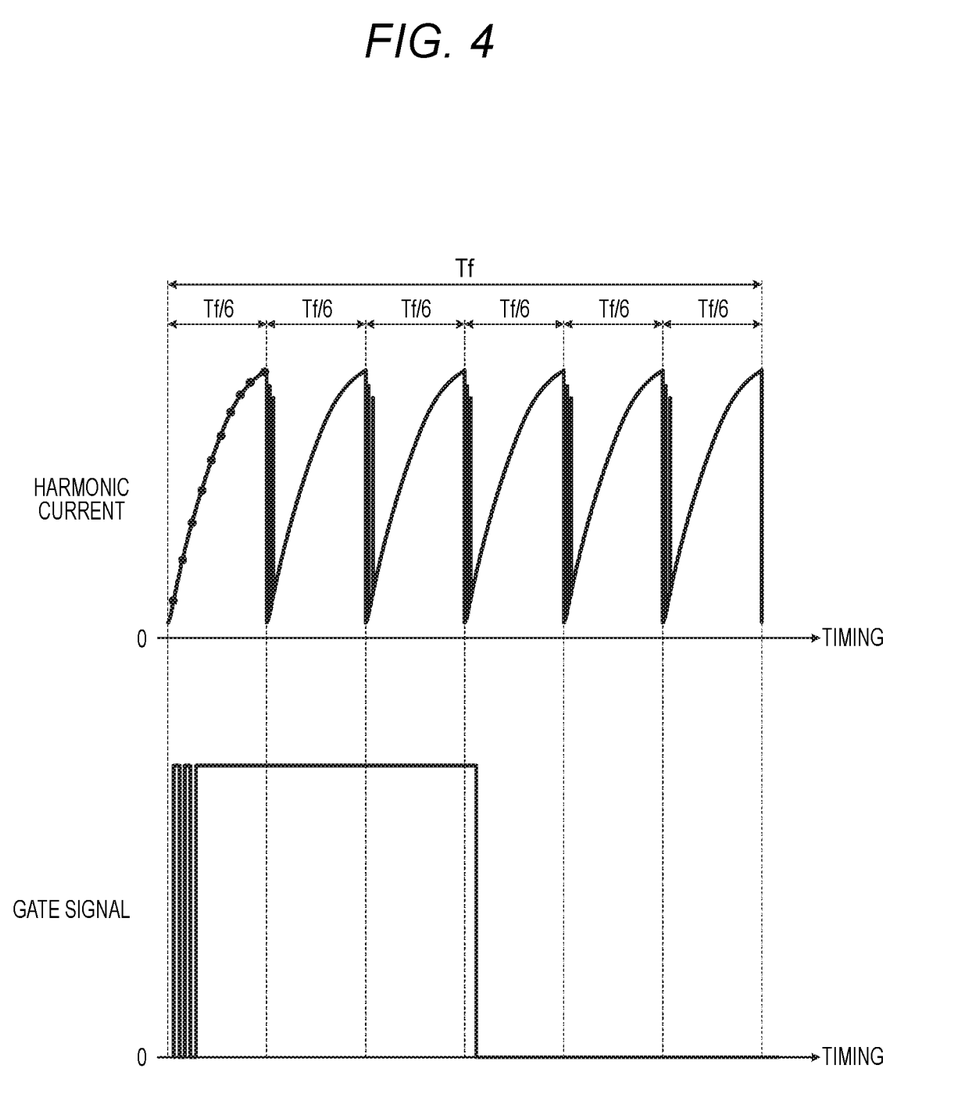
FIG. 4 is a diagram showing an example of a prediction target period during overmodulation PWM control.

The control device 30 may drive the second inverter 12 (that is, the second motor M2) by switching between two modulation methods of sinusoidal PWM control and overmodulation PWM control. FIG. 4 shows an example of a gate signal applied to a gate terminal of a switching element of the second inverter 12 by the control device 30 and the harmonic current generated from the second inverter 12 during the overmodulation PWM control.

The control device 30 may switch the prediction target period to be set by a modulation method. Specifically, when the second inverter 12 is driven by the sinusoidal PWM control, the control device 30 sets the prediction target period including the next carrier cycle (that is, one carrier cycle) as shown in FIG. 3 and the like.

In contrast, when the second inverter 12 is driven by the overmodulation PWM control, the control device 30 sets the prediction target period longer than when the second inverter 12 is driven by the sinusoidal PWM control. Specifically, in this case, as shown in FIG. 4, the control device 30 sets a prediction target period including one-sixth of a fundamental wave period Tf of the second inverter 12 (that is, Tf/6). Here, the fundamental wave period Tf of the second inverter 12 is a reciprocal of the fundamental wave frequency obtained by dividing a rotation frequency of the second motor M2 by the number of pole pairs (the number of switching elements of the second inverter 12). In this case, the control device 30 sets a prediction point at a time interval obtained by further dividing a period of one-sixth of the fundamental wave period Tf by 10 (see black circles in FIG. 4).

In this way, the control device 30 can set an appropriate prediction target period and prediction points by the modulation methods, and can reduce the processing load for performing the prediction while enabling the harmonic current to be predicted accurately. That is, during the overmodulation PWM control, a frequency of the harmonic current is lower than that during the sinusoidal PWM control, and the change in the harmonic current is gentler than that during the sinusoidal PWM control. Therefore, it is possible to accurately predict the harmonic current without predicting the harmonic current at a short interval. Therefore, when the second inverter 12 is driven by the overmodulation PWM control, by setting the prediction target period and the prediction points as described above, the control device 30 can reduce prediction of the harmonic currents for the excessive prediction points.

[Modification]

Next, a modification of the above-described embodiment will be described. In the following description, the same components as those described above are denoted by the same reference numerals, and description thereof will be omitted or simplified as appropriate.

Figure 5:
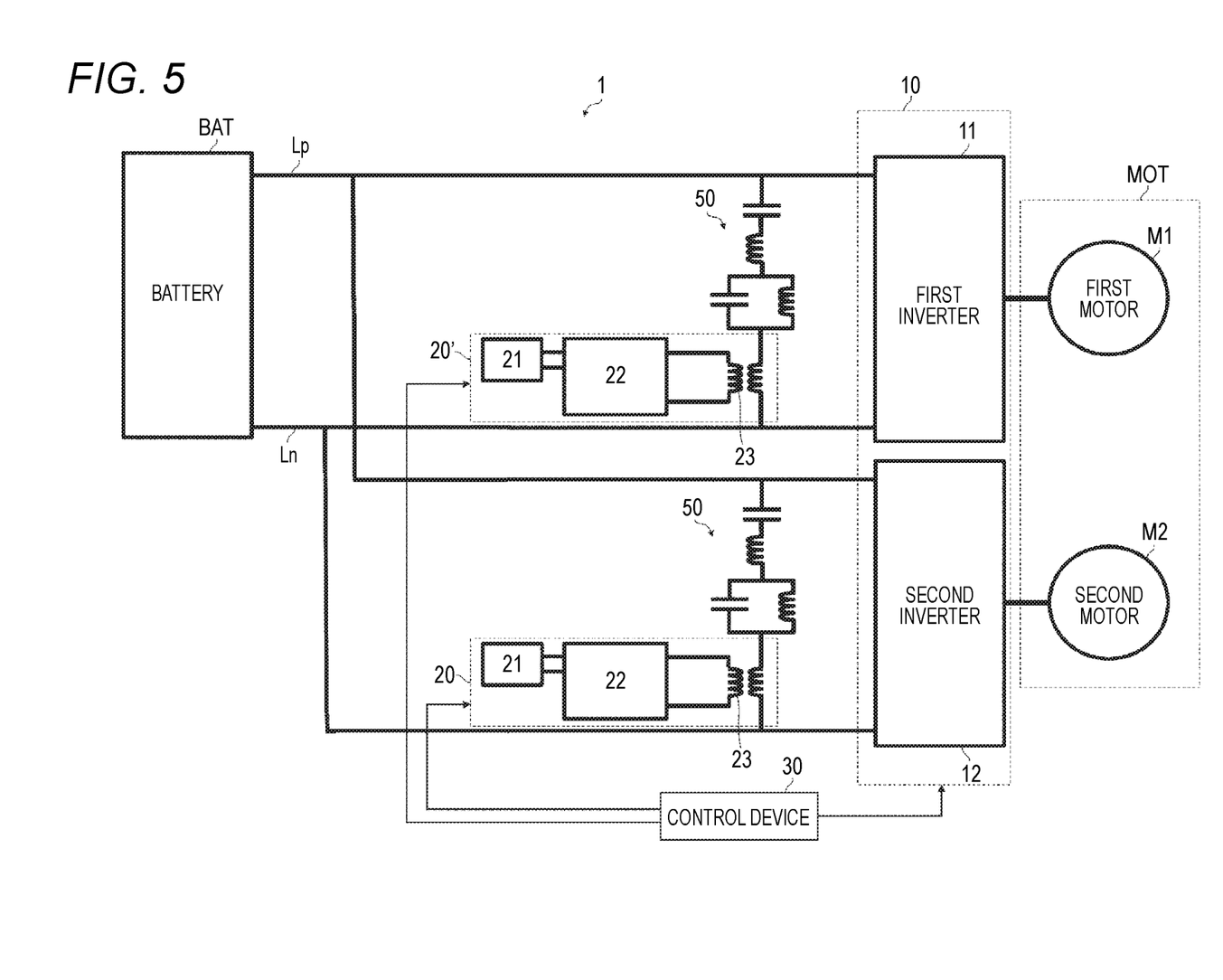
FIG. 5 is a diagram showing a modification of the motor drive system 1.

In the example described above, only the active filter unit 20 that generates the compensation current having the polarity opposite to that of the harmonic current generated from the second inverter 12 is provided, but the present invention is not limited thereto. For example, as shown in FIG. 5, in addition to the active filter unit 20 that generates the compensation current having the polarity opposite to that of the harmonic current generated from the second inverter 12, an active filter unit 20' that generates a compensation current having a polarity opposite to that of a harmonic current generated from the first inverter 11 may be further provided. That is, as shown in FIG. 5, the motor drive system 1 may be configured such that the first motor M1, the first inverter 11, and the active filter unit 20', and the second motor M2, the second inverter 12, and the active filter unit 20 are connected in parallel to the battery BAT that supplies power to the inverters 11 and 12. When the active filter unit 20' is provided, the control device 30 may predict the harmonic current generated from the first inverter 11 based on control information of the first motor M1 and the like, and cause the active filter unit 20' to generate the compensation current having the polarity opposite to that of the harmonic current, in the same manner as in the example described above. In this way, the harmonic current generated from the first inverter 11 can also be suppressed. Therefore, it is possible to more appropriately suppress the harmonic current of the motor drive system 1 in which the first motor M1, the first inverter 11, and the active filter unit 20', and the second motor M2, the second inverter 12, and the active filter unit 20 are connected in parallel to the battery BAT.

As shown in FIG. 5, passive filters 50 may be provided instead of the inductor 24 described above. Similarly, the passive filter 50 may also be provided between the battery BAT and the active filter unit 20'.

As described above, according to the present invention, it is possible to appropriately suppress the harmonic current while reducing the processing load of the control device.

Although various embodiments of the present invention have been described above with reference to the drawings, it is needless to say that the present invention is not limited to these examples. It will be apparent to those skilled in the art that various changes and modifications may be conceived within the scope of the claims. It is also understood that the various changes and modifications belong to the technical scope of the present invention. Further, components in the embodiment described above may be combined freely within a range not departing from the spirit of the present invention.

At least the following matters are described in the present description. Although corresponding components and the like in the above-described embodiment are shown in parentheses, the present invention is not limited thereto.

(1) A control device (the control device 30), in which
the control device is configured to control an active filter unit (the active filter unit 20, the active filter unit 20'),
the active filter is configured to suppress a harmonic current generated from an inverter (the first inverter 11, the second inverter 12),
the inverter is configured to drive a motor (the first motor M1, the second motor M2),
the control device includes:
a prediction unit (the prediction unit 310) configured to predict the harmonic current at each of prediction points included in a predetermined prediction target period after current time based on control information of the motor in at least a next carrier cycle of the inverter; and
a command value determination unit (the command value determination unit 320) configured to output, to the active filter unit, a current command value for generating a compensation current having a polarity opposite to a polarity of a harmonic current at a prediction point, at a timing corresponding to the prediction point included in the next carrier cycle in the prediction target period, based on a prediction result of the prediction unit,
in which each of the prediction points is provided at a predetermined time interval since start time of the prediction target period, and
in which the time interval is longer as the next carrier cycle is longer.

According to (1), it is possible to appropriately suppress the harmonic current while reducing a processing load of the control device.

(2) The control device according to (1),
in which the control device is configured to be able to drive the inverter by switching between two modulation methods including sinusoidal PWM control and overmodulation PWM control, and
in which when the inverter is driven by the overmodulation PWM control, the control device makes the prediction target period longer than the prediction target period when the inverter is driven by the sinusoidal PWM control.

According to (2), it is possible to set an appropriate prediction target period by the modulation methods, and it is possible to reduce the processing load of the control device for performing the prediction while enabling the harmonic current to be predicted accurately.

(3) The control device according to (2),
in which the prediction target period when the inverter is driven by the sinusoidal PWM control includes the next carrier cycle, and
in which the prediction target period when the inverter is driven by the overmodulation PWM control includes one-sixth of a fundamental wave period of the inverter.

According to (3), it is possible to set an appropriate prediction target period by the modulation methods, and it is possible to reduce the processing load of the control device for performing the prediction while enabling the harmonic current to be predicted accurately.

(4) The control device according to any one of (1) to (3),
in which the number of prediction points included in the next carrier cycle is constant regardless of a length of the next carrier cycle.

According to (4), it is possible to predict the harmonic current generated in the carrier cycle with a substantially constant processing load regardless of the length of the next carrier cycle.

(5) The control device according to any one of (1) to (4),
in which a period from a completion timing at which prediction of the harmonic current at each of the prediction points is completed to a start timing of the next carrier cycle is shorter than a period from a timing at which a command value for driving the inverter in the next carrier cycle is determined to a prediction start timing at which prediction of the harmonic current at each of the prediction points is started.

According to (5), it is possible to reduce the processing load of the control device for predicting the harmonic current generated in the next carrier cycle.

(6) A motor drive system (the motor drive system 1) including the control device according to any one of (1) to (5), in which a plurality of the motors, a plurality of the inverters configured to drive the plurality of motors, and a plurality of the active filter units configured to suppress the harmonic currents generated from the plurality of inverters are connected in parallel to a power supply configured to supply power to each of the inverters.

According to (6), it is possible to appropriately suppress the harmonic current of the motor drive system in which the plurality of motors, the plurality of inverters that drive the plurality of motors, and the plurality of active filter units that suppress the harmonic currents generated from the plurality of inverters are connected in parallel to the power supply that supplies power to each of the inverters.

The invention claimed is:

1. A control device, wherein
the control device is configured to control an active filter unit,
the active filter unit is configured to suppress a harmonic current generated from an inverter,
the inverter is configured to drive a motor, and
the control device comprises:
  a prediction unit configured to predict the harmonic current at each of prediction points comprised in a predetermined prediction target period after a prediction start timing, based on control information of the motor in at least a next carrier cycle of the inverter, and
  a command value determination unit configured to output, to the active filter unit, a current command value for generating a compensation current having a polarity opposite to a polarity of a harmonic current at a prediction point, the outputting of the current command value being at a timing corresponding to the prediction point comprised in the next carrier cycle in the predetermined prediction target period and being based on a prediction result of the prediction unit,
each of the prediction points is provided at a predetermined time interval since start time of the predetermined prediction target period, and
the predetermined time interval is longer as the next carrier cycle is longer.

2. The control device according to claim 1,
wherein the control device is configured to drive the inverter by switching between two modulation methods of sinusoidal PWM control and overmodulation PWM control, and
wherein when the inverter is driven by the overmodulation PWM control, the control device makes the predetermined prediction target period longer than the predetermined prediction target period when the inverter is driven by the sinusoidal PWM control.

3. The control device according to claim 2,
wherein the predetermined prediction target period when the inverter is driven by the sinusoidal PWM control comprises the next carrier cycle, and
wherein the predetermined prediction target period when the inverter is driven by the overmodulation PWM control comprises one-sixth of a fundamental wave period of the inverter.

4. The control device according to claim 1,
wherein the number of prediction points comprised in the next carrier cycle is constant regardless of a length of the next carrier cycle.

5. The control device according to claim 1,
wherein a period from a completion timing, at which prediction of the harmonic current at each of the prediction points is completed to a start timing of the next carrier cycle, is shorter than a period from a timing at which a command value for driving the inverter in the next carrier cycle is determined to a prediction start timing at which prediction of the harmonic current at each of the prediction points is started.

6. A motor drive system comprising the control device according to claim 1,
wherein the motor comprises a plurality of motors, the active filter unit comprises a plurality of active filter units, and the inverter comprises a plurality of inverters, and
wherein the plurality of the motors, k plurality of the inverters configured to drive the plurality of motors, and the plurality of the active filter units configured to suppress the harmonic currents generated from the plurality of inverters are connected in parallel to a power supply configured to supply power to each inverter of the plurality of inverters.

* * * * *